US009038373B2

(12) United States Patent
Geveci et al.

(10) Patent No.: US 9,038,373 B2
(45) Date of Patent: May 26, 2015

(54) AMMONIA SENSOR CONTROL OF AN SCR AFTERTREATMENT SYSTEM (75) Inventors: Mert Geveci, Athens, GA (US); Andrew W. Osburn, Nashville, IN (US); Donald W. Stanton, Columbus, IN (US)

(73) Assignee: Cummins Inc., Columbus, IN (US)

( * ) Notice: Subject to any disclaimer, the term of this patent is extended or adjusted under 35 U.S.C. 154(b) by 1040 days.

(21) Appl. No.: 13/051,693

(22) Filed: Mar. 18, 2011

(65) Prior Publication Data
US 2011/0265452 A1 Nov. 3, 2011

Related U.S. Application Data (60) Provisional application No. 61/330,605, filed on May 3, 2010.

(51) Int. Cl.
*F01N 3/20* (2006.01)
*F01N 13/00* (2010.01)
(52) U.S. Cl.
CPC ........... *F01N 3/208* (2013.01); *F01N 2560/021* (2013.01); *F01N 2560/026* (2013.01);
(Continued)
(58) Field of Classification Search
CPC ....... F01N 3/2066; F01N 3/2208; F01N 3/18; F01N 2560/026; F01N 2610/146; F01N 2570/14; F01N 2900/1806; F01N 2900/1616; F01N 2900/1622; F01N 2560/021; F02D 2041/1468
USPC ........................................... 60/286, 295, 301
See application file for complete search history.

(56) References Cited

U.S. PATENT DOCUMENTS 5,555,725 A    9/1996  Shimasaki et al.
5,645,745 A    7/1997  Hartwick et al.
(Continued)

FOREIGN PATENT DOCUMENTS

WO    2007084690    7/2007
WO    2008009940    1/2008
(Continued)

OTHER PUBLICATIONS

International Search Report and Written Opinion, PCT/US2011/034798, Cummins, Inc., Jul. 15, 2011, 7 pgs.
(Continued)

*Primary Examiner* — Kenneth Bomberg
*Assistant Examiner* — Jonathan Matthias
(74) *Attorney, Agent, or Firm* — Krieg DeVault LLP (57) ABSTRACT A system includes an engine, an exhaust conduit for the engine, a first SCR catalyst fluidly coupled to the exhaust conduit, and a second SCR catalyst fluidly coupled to the exhaust conduit at a position downstream of the first SCR catalyst. The system further includes an ammonia sensor positioned between the first and second SCR catalysts. A reductant doser is positioned upstream of the first SCR catalyst. The system includes a controller that determines an amount of $NH_3$ present from the $NH_3$ sensor, and computes an actuator response function from at least one operating condition of the first SCR catalyst. The actuator response function includes a reductant injector response as a function of the amount of $NH_3$, and the actuator response function includes a response discontinuity. The controller further determines a reductant injection amount from the amount of $NH_3$ and the actuator response function, and provides a reductant injector command.

43 Claims, 5 Drawing Sheets (52) U.S. Cl.
CPC ....... *F01N2610/02* (2013.01); *F01N 2610/146* (2013.01); *F01N 2900/1402* (2013.01); *F01N 2900/1602* (2013.01); *F01N 2900/1621* (2013.01); *F01N 2900/1622* (2013.01); *F01N 2900/0402* (2013.01); *F01N 2900/0408* (2013.01); *F01N 2900/1616* (2013.01); *Y02T 10/24* (2013.01); *F01N 13/0093* (2014.06)

(56) References Cited

U.S. PATENT DOCUMENTS

| | | | |
|---|---|---|---|
| 5,746,053 | A | 5/1998 | Hibino |
| 6,069,013 | A | 5/2000 | Plog et al. |
| 6,314,722 | B1 | 11/2001 | Matros et al. |
| 6,347,544 | B1 | 2/2002 | Hada et al. |
| 6,415,602 | B1 | 7/2002 | Patchett et al. |
| 6,662,553 | B2 | 12/2003 | Patchett et al. |
| 6,742,326 | B2 | 6/2004 | Xu et al. |
| 6,755,014 | B2 | 6/2004 | Kawai et al. |
| 6,904,751 | B2 | 6/2005 | Makki et al. |
| 6,996,975 | B2 | 2/2006 | Radhamohan et al. |
| 7,069,770 | B2 | 7/2006 | Chen et al. |
| 7,093,427 | B2 | 8/2006 | van Nieuwstadt et al. |
| 7,150,145 | B2 | 12/2006 | Patchett et al. |
| 7,178,328 | B2 | 2/2007 | Solbrig |
| 7,204,081 | B2 | 4/2007 | Yasui et al. |
| 7,213,395 | B2 | 5/2007 | Hu et al. |
| 7,426,825 | B2 | 9/2008 | Viola et al. |
| 7,610,759 | B2 | 11/2009 | Yoshida et al. |
| 7,613,561 | B1 | 11/2009 | Stewart et al. |
| 7,810,313 | B2 | 10/2010 | Stewart et al. |
| 8,112,986 | B2 | 2/2012 | Kurtz |
| 8,176,730 | B2 | 5/2012 | Shimomura et al. |
| 8,201,394 | B2 | 6/2012 | Chi et al. |
| 8,281,578 | B2 | 10/2012 | Upadhyay et al. |
| 2002/0148220 | A1 | 10/2002 | Patchett et al. |
| 2003/0051468 | A1 | 3/2003 | Van Nieuwstadt et al. |
| 2003/0061861 | A1 | 4/2003 | Irion et al. |
| 2004/0083721 | A1 | 5/2004 | Ketcher et al. |
| 2005/0127920 | A1 | 6/2005 | Mowery et al. |
| 2005/0284134 | A1 | 12/2005 | Radhamohan et al. |
| 2007/0044456 | A1 | 3/2007 | Upadhyay et al. |
| 2007/0080074 | A1 | 4/2007 | Wang et al. |
| 2007/0122317 | A1* | 5/2007 | Driscoll et al. ............... 422/170 |
| 2008/0022658 | A1 | 1/2008 | Viola et al. |
| 2008/0250774 | A1 | 10/2008 | Solbrig |
| 2009/0031710 | A1 | 2/2009 | Wei et al. |
| 2009/0044526 | A1 | 2/2009 | Carroll, III et al. |
| 2009/0272105 | A1 | 11/2009 | Chi et al. |
| 2009/0301067 | A1 | 12/2009 | Dingle et al. |
| 2010/0000202 | A1 | 1/2010 | Fisher et al. |
| 2010/0024390 | A1 | 2/2010 | Wills et al. |
| 2010/0024397 | A1 | 2/2010 | Chi et al. |
| 2010/0043402 | A1 | 2/2010 | Perry et al. |
| 2010/0068147 | A1 | 3/2010 | Hibberd et al. |
| 2010/0122520 | A1 | 5/2010 | Han |
| 2010/0242440 | A1 | 9/2010 | Garimella et al. |
| 2011/0023463 | A1 | 2/2011 | Dobson et al. |

FOREIGN PATENT DOCUMENTS

| | | |
|---|---|---|
| WO | 2009036780 | 3/2009 |
| WO | 2009089936 | 7/2009 |

OTHER PUBLICATIONS

International Search Report and Written Opinion, PCT/US2011/034805, Cummins Inc., Jul. 28, 2011, 9 pgs.

International Search Report and Written Opinion, PCT/US2011/034807, Cummins Inc., Jul. 1, 2011, 11 pgs.

European Application No. 11778103.9, Extended European Search Report, Aug. 13, 2014, 5 pages.

* cited by examiner

AMMONIA SENSOR CONTROL OF AN SCR AFTERTREATMENT SYSTEM

RELATED APPLICATIONS

This application is related, and claims the benefit of, U.S. Provisional application 61/330,605 "Ammonia sensor control of an SCR aftertreatment system," filed May 3, 2010, which is incorporated herein by reference.

BACKGROUND

The technical field generally relates to SCR aftertreatment systems for internal combustion engines. Presently known SCR aftertreatment systems for engines suffer from several drawbacks, including control with an unknown amount of $NH_3$ stored on the SCR catalyst, and difficulty managing aging and degradation of the catalyst. Further, current SCR aftertreatment systems are highly reliant on $NO_x$ input data, which depend upon $NO_x$ models or a $NO_x$ sensor. Accurate $NO_x$ models are difficult to establish for transiently operated engine systems, and $NO_x$ sensors are expensive. Therefore, further technological developments are desirable in this area.

SUMMARY

One embodiment is a unique apparatus for controlling an SCR catalyst aftertreatment system. Further embodiments, forms, objects, features, advantages, aspects, and benefits shall become apparent from the following description and drawings.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
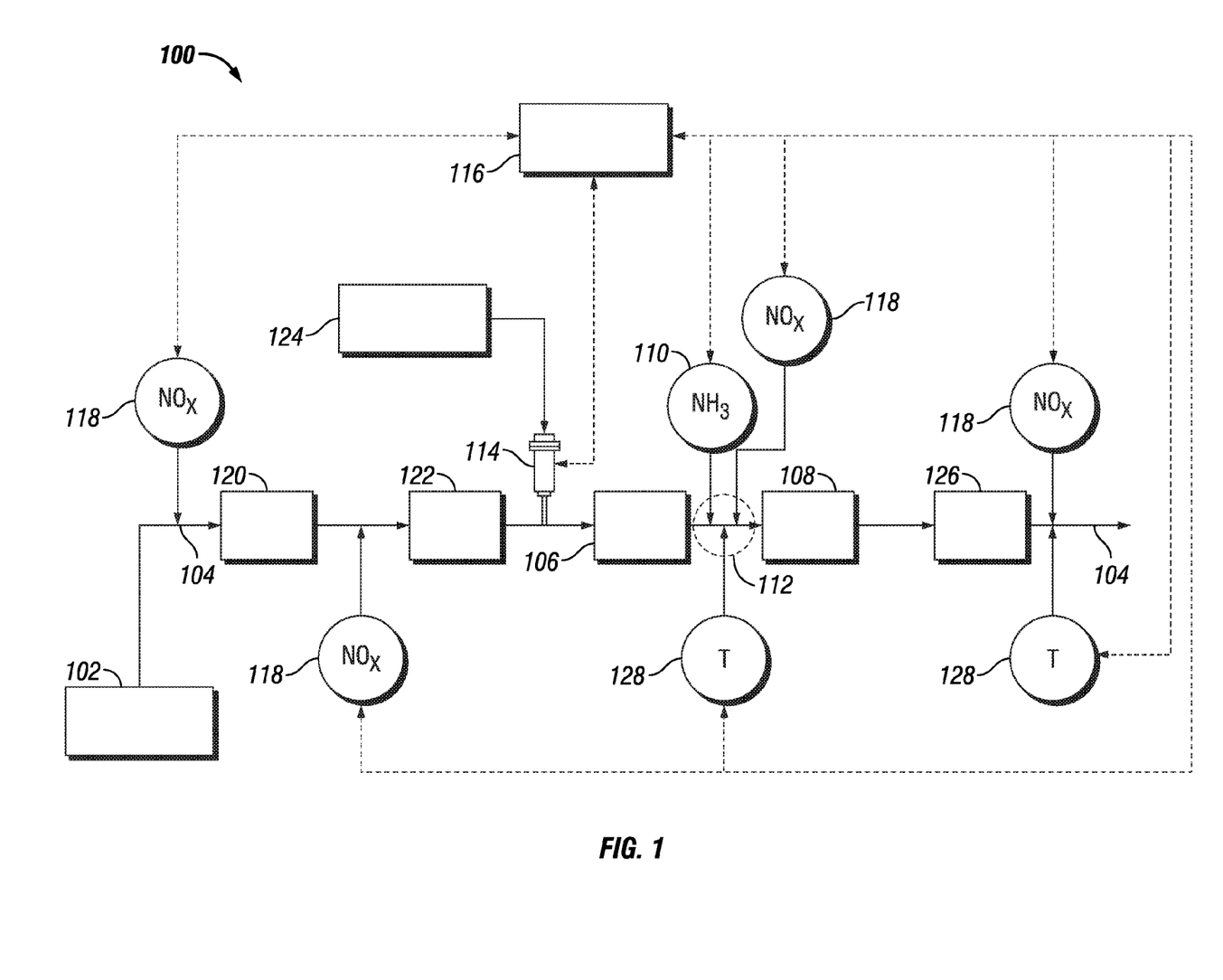
FIG. 1 is an exemplary system for control of an SCR aftertreatment system.

Referencing FIG. 1, an exemplary system 100 for control of a selective catalytic reduction (SCR) aftertreatment system is shown. The exemplary system 100 includes an internal combustion engine 102, an exhaust conduit 104 fluidly coupled to the internal combustion engine 102, a first SCR catalyst 106 fluidly coupled to the exhaust conduit 104, and a second SCR catalyst 108 fluidly coupled to the exhaust conduit 104 at a position downstream of the first SCR catalyst 106. The system 100 further includes an ammonia sensor 110 operationally coupled to the exhaust conduit 104 at a first exhaust gas position 112 downstream of the first SCR catalyst 106 and upstream of the second SCR catalyst 108. The system 100 further includes a reductant doser (injector) 114 operationally coupled to the exhaust conduit 104 at a position upstream of the first SCR catalyst 106, and a controller 116 having a number of modules structured to functionally execute operations for controlling an SCR aftertreatment system.

The first SCR catalyst 106 is illustrated downstream of a diesel oxidation catalyst (DOC) 120 and a diesel particulate filter (DPF) 122. Any of these components may be present or missing, catalyzed or not catalyzed, and may be arranged in alternate order. Further, certain components or all components may be provided in the same or separate housings.

The first SCR catalyst 106 and the second SCR catalyst 108 may occur within the same catalyst brick, with the position of the ammonia sensor 110 defining the separation point between the first SCR catalyst and the second SCR catalyst. The ammonia sensor 110 may be any type understood in the art. The reductant doser 114 is fluidly coupled to a reductant source 124 such as a reductant storage tank. The reductant is any type of reductant utilized in an SCR aftertreatment system that results in ammonia being utilized as the final reductant—including at least ammonia (gaseous or aqueous) and urea. Certain operations described herein apply to $NO_x$ reduction generally and are not specific to SCR systems. Where the $NO_x$ reduction operations are not specific to SCR systems, hydrocarbon or other reductants may be utilized.

The system 100 may include an ammonia oxidation catalyst (AMOX) 126 downstream of the second SCR catalyst 108. In certain embodiments, the AMOX 126 may not be present, or the AMOX 126 may be commingled with the second SCR catalyst 108 (or the last SCR catalyst, where multiple SCR catalysts are present), for example with a washcoat applied toward the rear portion of the second SCR catalyst 108 that is responsive to at least partially oxidize ammonia.

The exemplary system 100 further includes various additional sensors. The illustrated sensors include a $NO_x$ sensor 118 positioned upstream of the first SCR catalyst 106, a second $NO_x$ sensor 118 positioned downstream of the second SCR catalyst 108, a temperature sensor 128 positioned between the first and second SCR catalysts, and/or the temperature sensor 128 positioned downstream of the AMOX 126 catalyst. The illustrated sensors are exemplary only, and may be re-positioned, removed, substituted, and other sensors may be present that are not illustrated in FIG. 1. Certain embodiments of the system do not include a $NO_x$ sensor 118 present upstream of the first SCR catalyst 106, a $NO_x$ sensor 118 present downstream of the second SCR catalyst 108, or both. Further, certain sensors may instead be virtual sensors that are calculated from other parameters available to the system, or values that would be indicated by sensors may instead be supplied to a computer readable memory location, via a datalink or network communication, or otherwise be made available to the system where the sensor providing the sensed parameter is not a part of the defined system.

In certain embodiments, the system 100 further includes a controller structured to perform certain operations to control SCR aftertreatment systems. In certain embodiments, the controller forms a portion of a processing subsystem including one or more computing devices having memory, processing, and communication hardware. The controller may be a single device or a distributed device, and the functions of the controller may be performed by hardware or software. The controller may be in communication with any sensor, actuator, datalink, and/or network in the system.

In certain embodiments, the controller includes one or more modules structured to functionally execute the operations of the controller. In certain embodiments, the controller includes an $NH_3$ target module, an $NH_3$ determination module, an $NH_3$ error module, a dosing amount module, a dosing control module, a response bounding module, a response dampening module, an $NH_3$ fill-up module, and/or a $NO_x$ trimming module. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

Figure 2:
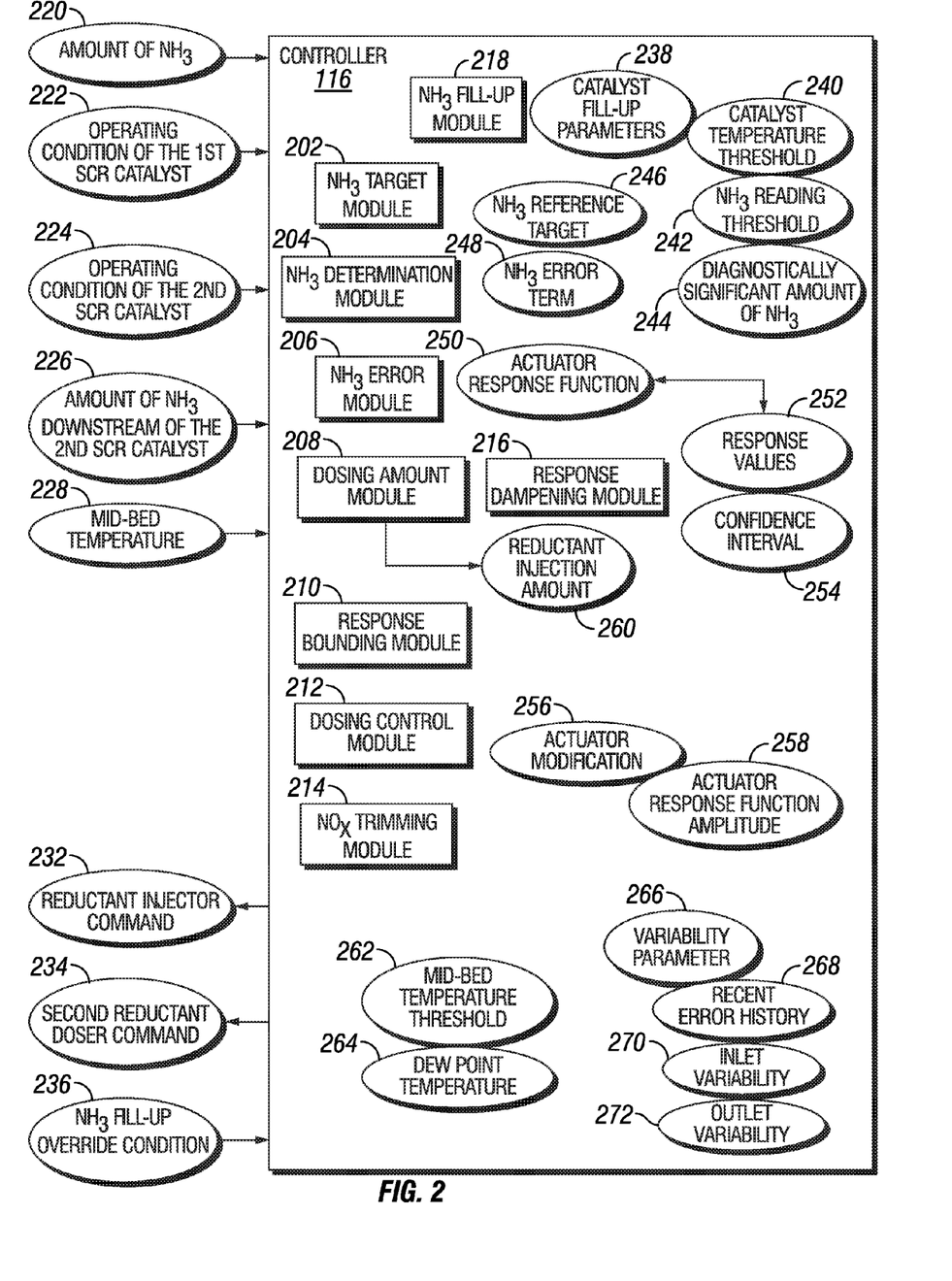
FIG. 2 is an exemplary controller for executing operations to control an SCR aftertreatment system.

FIG. 2 is an exemplary controller 116 for executing operations to control an SCR aftertreatment system. Certain embodiments of the controller 116 may not utilize all of the modules or reference all of the data illustrated in FIG. 2. The controller 116 includes an ammonia determination module 204 that determines an amount of $NH_3$ 220 present at the first exhaust gas position, for example by reading an amount of ammonia from the ammonia sensor and providing any compensation or correction. The controller 116 further includes a response bounding module 210 that computes an actuator response function 250 in response to operating condition(s) 222 of the first SCR catalyst. The actuator response function 250 includes a reductant injector response as a function of the amount of $NH_3$ 220, the actuator response function having a response discontinuity. In certain embodiments, the shape and limits of the actuator response function 250 are dynamically calculated in response to the operating condition(s) 222 of the first SCR catalyst.

In certain embodiments, the operating condition(s) 222 of the first SCR catalyst include a current space-velocity of the first SCR catalyst, a flow rate through the first SCR catalyst, a bed temperature of the first SCR catalyst, a $NO_x$ concentration at the first SCR catalyst inlet, an engine torque value, an engine fueling rate, a current $NH_3$ storage amount, a current $NH_3$ storage capacity, and/or a current $NH_3$ storage capacity available. In one embodiment, the bed temperature of the first SCR catalyst 106 is determined without any temperature input from a sensor or estimated temperature value of the exhaust conduit 104 upstream of the first SCR catalyst 106. Another exemplary operating condition includes an inlet temperature of the first SCR catalyst 106, although in certain embodiments, the operating condition(s) 222 exclude any temperature input between the engine 102 and the first SCR catalyst 106.

The controller 116 further includes a dosing amount module 208 that determines a reductant injection amount 260 in response to the amount of $NH_3$ 220 and the actuator response function 250, and a dosing control module 212 that provides a reductant injector command 232 in response to the reductant injection amount 260.

The exemplary controller 116 further includes an ammonia target module 202 that determines an ammonia reference target 246 that is a target amount of ammonia at the first exhaust gas conduit position. The target amount of ammonia is described in any terms understood in the art, including without limitation a mass of ammonia over a specified time, a concentration of ammonia by mass or volume, or an amount of ammonia relative to an amount of $NO_x$ present in the exhaust conduit (an ammonia to $NO_x$ ratio, ANR). Where the target amount of ammonia is determined in response to a $NO_x$ amount, the $NO_x$ amount may be determined according to NO, $NO_2$, or $NO_x$.

The controller 116 further includes an ammonia error module 206 that determines an ammonia error term 248 in response to the ammonia reference target 246 and the amount of ammonia 220. The ammonia error term 248 may be a difference between the ammonia reference target 246 and the amount of ammonia 220. In certain embodiments, error handling, filtering, and limiting of certain data values, as understood in the art, may cause the ammonia error term 248 to be a value different than the difference between the ammonia reference target 246 and the amount of ammonia 220 during various time periods.

The dosing amount module 208 further determines the reductant injection amount 260 in response to the ammonia error term 248. The ammonia reference target 246 is a value selected from: greater than zero, greater than 5 ppm $NH_3$, less than a stoichiometric ANR, and/or greater than the stoichiometric ANR. In certain embodiments, the ammonia reference target 246 is always a value that is greater than or less than a stoichiometric value, but never equal to a stoichiometric value.

Referencing FIG. 3, a first actuator response function 250a is a binary output of a high response value 312 and a low response value 314 based on a response index 304. The high response value 312 a value greater than a stoichiometric amount of ammonia, such as any value greater than stoichiometric to 2 times stoichiometric. In certain embodiments, the high response value may be three times, four times, five times stoichiometric or even higher. In one example, the high response value is between 1.1 and 1.5 times stoichiometric. The presence of an AMOX catalyst, the operating temperature of the AMOX catalyst, the emissions control scheme and required $NO_x$ reduction, as well as other parameters understood in the art will determine appropriate high response values.

Figure 3A:
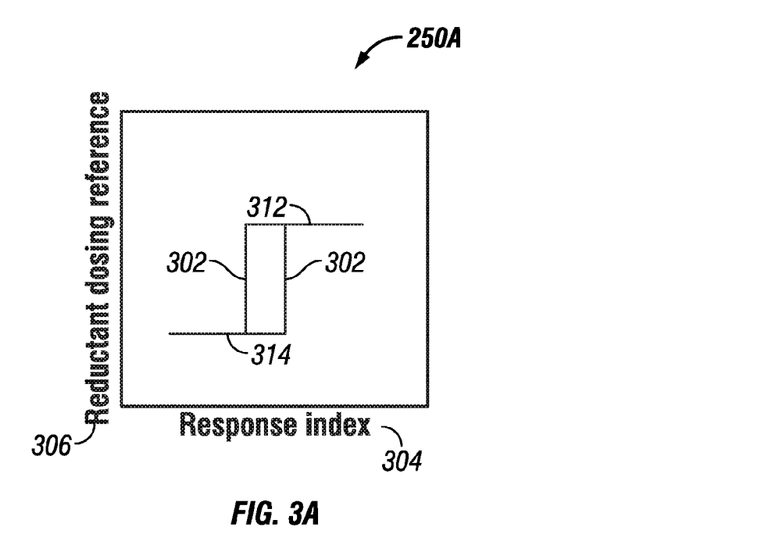
FIGS. 3A through 3E illustrate actuator response functions utilized in controlling an SCR aftertreatment system.

In certain embodiments, the high response value 312 is determined as a value greater than a required conversion amount of the SCR catalyst system, in ratios similar to those described. For example, where a modestly capable SCR system is included that requires 30% conversion of the $NO_x$ out of the engine, such as when only 30% is required to meet an emissions standard, the high response value 312 is between 1.1 to 1.5 times the 30%, up to 2 times, 3 times, 4 times, 5 times, or greater than the 30% conversion requirement.

An exemplary high response value 312 is greater than a stoichiometric value 320 plus a confidence interval 254. An exemplary low response value 314 is less than the stoichiometric value 320 minus a confidence interval 254. An exemplary confidence interval 254 is an amount where the measured $NH_3$ is determined to be highly likely to be above (or below) the stoichiometric ANR, after accounting for sensor errors and uncertainty and transient response of sensors and estimators. Exemplary values of the confidence value 254 include 0.1 ANR, 0.3 ANR, 10 ppm $NH_3$, and 15 ppm $NH_3$. For example, if the exemplary confidence value 254 is 0.1 ANR on the high side and 0.25 ANR on the low side, the high response value 312 is greater than a 1.1 ANR and the low response value 314 is lower than a 0.75 ANR. The stoichiometric value 320 is an ANR value of 1, or an amount of ammonia that is just sufficient to react all of the $NO_x$ (e.g. NO, $NO_2$, or both) in the exhaust conduit 104. The confidence interval 254 for the high response value 312 may be the same number or a different number than the confidence interval 254 for the low response value 314, and may also change with time or operating conditions 222.

The low response value 314 is a value lower than a stoichiometric amount of ammonia, such as any value lower than stoichiometric to 0.7 times stoichiometric. In certain embodiments, the low response value may be as low as 0.5 or 0.3 times stoichiometric. In one example, the low response value is about 0.9 times stoichiometric. The accuracy of determinations of amounts of ammonia, amounts of $NO_x$, exhaust flow rates, and other estimates and sensed values, as well as the desired rate of consumption of ammonia from the SCR catalyst, will determine appropriate low response values. In certain embodiments, the values of the high response value and the low response value are fixed, and in certain embodiments the values of the high response value and the low response value change as a function of the operating condition(s) 222 of the SCR catalyst.

An exemplary confidence interval 254 for the high response value 312 is a confidence value (e.g. 95% confidence) that, based on estimated errors determining engine $NO_x$ and variability in the reductant injector response relative to the reductant injector command 232, that the actual injected amount will exceed the $NH_3$ reference target 246. An exemplary confidence interval 254 for the low response value 314 is a confidence value (e.g. 95% confidence) that, based on estimated errors determining engine $NO_x$ and variability in the reductant injector response relative to the reductant injector command 232, that the actual injected amount will not exceed the $NH_3$ reference target 246.

An exemplary low response value 314 is less than the stoichiometric value 320 minus a confidence interval 254. The confidence interval 254 includes uncertainties in any measurements or estimates, and is a value that may change over time or operating conditions, for example with degradation of components or during periods where models are uncertain. Exemplary, non-limiting, factors that may affect the confidence interval 254 include the fidelity of engine-out $NO_x$ determinations and $NO/NO_2$ ratio determinations, determinations of conversion of NO to $NO_2$ on a catalyst, determinations of the present exhaust flow rate, uncertainty of injected versus commanded reductant amounts, and uncertainties on the hydrolysis rate of urea to $NH_3$.

The response index 304 includes the amount of $NH_3$ 220, but may be a value determined as a function of the amount of $NH_3$, for example and without limitation a concentration, flow rate, normalized value, or an $NH_3$ error term 248 determined by the $NH_3$ error module 206 in response to an $NH_3$ reference target 246 and the amount of $NH_3$ 220.

Figure 3B:
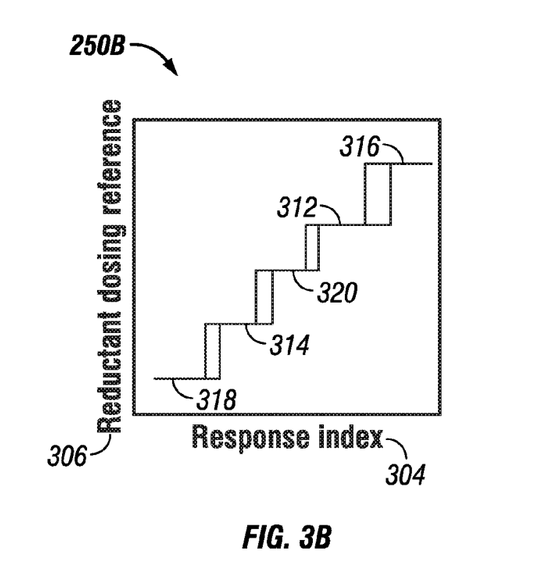
Figure 3C:
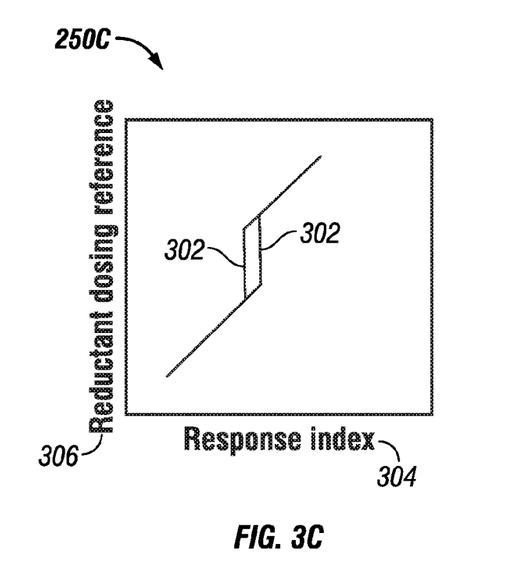
Figure 3D:
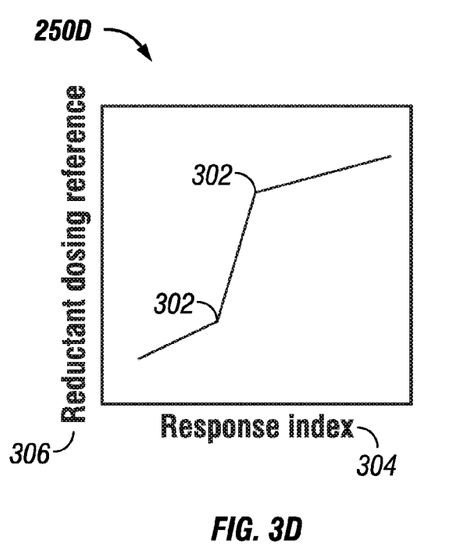
Figure 3E:
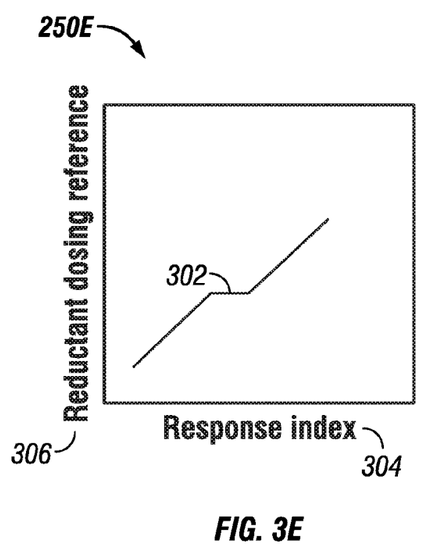

The first actuator response function 250a includes a response discontinuity 302. The response discontinuity 250a includes at least one range of reductant dosing reference values 306 that are not available as reductant injector responses. The range of not available reductant injector responses at the discontinuity 302 are between a minimum reductant dosing reference (the low response value 314) and a maximum reductant dosing reference (the high response value 312). The minimum reductant dosing reference is the lowest normally occurring dosing reference, the lowest dosing reference the reductant injector is capable of, or a minimal but protective dosing amount of the reductant injector. The maximum reductant dosing reference is the highest normally occurring dosing reference, the highest dosing reference the reductant injector is capable of, the highest reductant injection amount where excessive ammonia does not slip out of the system, or a highest reductant injection amount that still allows reductant injector diagnostics to be performed. Alternatively or additionally, a discontinuity 302 includes a position of the actuator response function that is not continuous (or differentiable)—for example as illustrated with the actuator response function 250d or with the actuator response function 250e.

The actuator response function 250a is illustrated with a hysteresis to prevent mode cycling with small fluctuations in the response index 304, but the presence or amount of hysteresis for a given embodiment is a mechanical step for one of skill in the art with the benefit of the disclosures herein. The reductant dosing reference 306 is the target ammonia amount, and the actuator injects reductant to achieve the target ammonia amount. The reductant dosing reference 306 is an amount of $NH_3$ (or precursor such as urea) to inject, a concentration of $NH_3$ for the reductant injector to achieve, and/or an ANR value for the reductant injector to achieve.

Alternate actuator response functions 250b, 250c are also illustrated in FIG. 3. The actuator response function 250c exhibits a large center step-change, and the actuator response function 250e exhibits a large center flat response. The implications of each actuator response function 250a, 250b, 250c, 250d, 250e will be understood to those of skill in the art having the benefit of the disclosures herein. While a few exemplary actuator response functions 250 are described, the illustrated actuator response functions 250 are non-limiting, and the illustrated actuator response functions 250 are further not limited to the uses and purposes described herein.

Another actuator response function 250b is illustrated. The actuator response function 250b includes a very low response value 318 and a low response value 314, a very high response value 316 and a high response value 312, and a stoichiometric value 320. The stoichiometric value 320 may not be a selectable response value from the actuator response function 250b in certain embodiments, with the actuator response function returning only values of very low, low, high, and very high. The very high response value 316 may be utilized when the response index 304 is very large—for example where the ammonia error term 248 indicates that the desired ammonia reference target 246 is much larger than the amount of $NH_3$ 220. The very low response value 318 may be utilized when the response index 304 is very small—for example where the ammonia error term 248 indicates that the desired ammonia reference target 246 is much smaller than the amount of $NH_3$ 220. In certain embodiments, the very low response value 318 is as low as zero reductant dosing. In certain further embodiments, the very low response value 318 provides for reductant dosing at only a diagnostic amount (i.e. injecting enough to diagnose the reductant injector) or an injector protection amount (e.g. injecting enough to ensure the injector remains clear for injection operations). An exemplary very low response value 318 is a value between zero and 0.3 times a stoichiometric amount of $NH_3$.

In certain embodiments, the discontinuity 302 involves a sharp change of the reductant dosing reference 306 and occurs in the region of a response index value 304 that is consistent with a desired amount of ammonia (e.g. the $NH_3$ reference target 246) at the position 112 between the first SCR catalyst and the second SCR catalyst, which provides for a strong actuator response to offset values from the desired set point. The actuator response 250a is illustrative of the strong actuator response away from the setpoint. By contrast, the actuator response function 250e includes a response having a constant gain with a stoichiometric response value at the discontinuity 302 for a range of response index values 304, which provides for a predictable reductant injection amount. The actuator response 250e may be desirable, for example, where the $NO_x$ amount at the first SCR catalyst inlet and the $NH_3$ injection amounts (the actual reductant injector response to the reductant injector command) are well modeled and feedback control is only desired to correct large offsets from the desired set point.

The very high response value 316 is a value significantly greater than the high response value 312, and a value of three to five times stoichiometric, or 2.5 to five times stoichiometric, for the very high response value 316 is exemplary and non-limiting. Hysteresis is shown between each reductant dosing reference step (e.g. between very low 318 to low 314), however, some or all of the steps may not have hysteresis, and the amount of hysteresis may differ for each step. The relative sizes of the hysteresis amounts are exemplary. The determination of a very high response value 316 is dependent upon how much $NH_3$ can be injected at the present operating conditions without slipping an unacceptable amount of $NH_3$ out of the system 100. The number of SCR catalysts 106, 108 the presence and size of an AMOX 126, the current operating temperature of the system 100 components, and other determinations known to one of skill in the art contemplating a specific system 100 are factors that determine the very high response value 316.

The reductant dosing reference 306 is utilized to control the reductant doser 114 by any control mechanism understood in the art. The reductant dosing reference 306 may be a feedforward and/or feedback target value, and the control mechanism includes a PID controller, a PI controller, a fuzzy logic controller, or any other type of controller known in the art.

The exemplary controller 116 further includes a response dampening module 216 that dynamically tracks a variability parameter 266, and modifies the actuator response function 250 in response to the variability parameter 266. Exemplary variability parameters and modifications are described. An example includes the variability parameter 266 being a recent error history variability 268 and the response dampening module 216 changes an amplitude of the actuator response function 250 inversely with the recent error history variability 268.

The recent error history variability 268 is any description of error history variability understood in the art. Non-limiting examples include a statistical description of the recent error history such as a standard deviation of a rolling buffer of error terms, a moving average (or a filtered value) of error differences or differentials, a slope of a rolling buffer of error terms, or other description understood in the art. In certain embodiments, for example where the error signal is small or noisy, a target value (e.g. the $NH_3$ reference target 246) or other magnitude reading may be substituted for the error in the recent error history variability 268. For example, the $NO_x$ amount history variability (at any position in the exhaust conduit) or the $NH_3$ reference target 246 variability may be utilized for the variability parameter 266 instead of the error history variability 268.

Exemplary adjustments of an amplitude of actuator response functions 250 are described. An exemplary response dampening module 216 tracks a recent error history variability 268 and changes an amplitude of the response function 250 inversely with the recent error history variability 268. For example, referencing FIG. 3, the amplitude of the actuator response function comprises the relative or absolute (or both) vertical extent of the actuator response function 250. In the example of FIG. 3, where the actuator response function 250a is utilized, difference between the low response value 314 and the high response value 312 is reduced when the amplitude of the actuator response function 250 is reduced. In the provided example, where the error history variability 268 is decreasing, the amplitude of the actuator response function 250a is increased, and where the error history variability 268 is increasing, the amplitude of the actuator response function 250a is decreased.

Another exemplary response dampening module 216 dynamically tracks a variability parameter 266 as an inlet variability 270 and an outlet variability 272, and the response dampening module 216 decreases an amplitude of the actuator response function 250 when the inlet variability 270 is high and the outlet variability 272 is low. The inlet variability 270 and the outlet variability 272 may be the variability of the flow rate of $NO_x$ or $NH_3$ with respect to time, and/or a variability of a total flow rate in the exhaust conduit at the inlet and/or outlet of any aftertreatment component.

Yet another example includes the variability parameter 266 being an inlet variability 270 and an outlet variability 272, and the response dampening module 216 decreasing the amplitude of the actuator response function 250 when the inlet variability 270 is low and the outlet variability 272 is high. Yet another example includes the variability parameter 266 being an inlet variability 270 and the response dampening module 216 increasing an amplitude of the actuator response function 250 when the inlet variability 270 is high. Still another example includes the variability parameter 266 being an outlet variability 272, and the response dampening module 216 decreases an amplitude of the actuator response function 250 when the outlet variability 272 is high.

The inlet variability 270 and outlet variability 272 may be of an error term 248, a target value 246, or other magnitude reading. In certain embodiments, the system includes a second reductant doser positioned between the first and second SCR catalyst (e.g. reference FIG. 6) and the inlet variability 270 and outlet variability 272 is relative to either SCR catalyst 106, 108, and the response dampening module 216 may adjust the amplitude of the response function 250 of either of the reductant dosers 114, both of the injectors together, or both of the injectors independently based on the variability observed for the corresponding SCR catalyst 106, 108.

Figure 4:
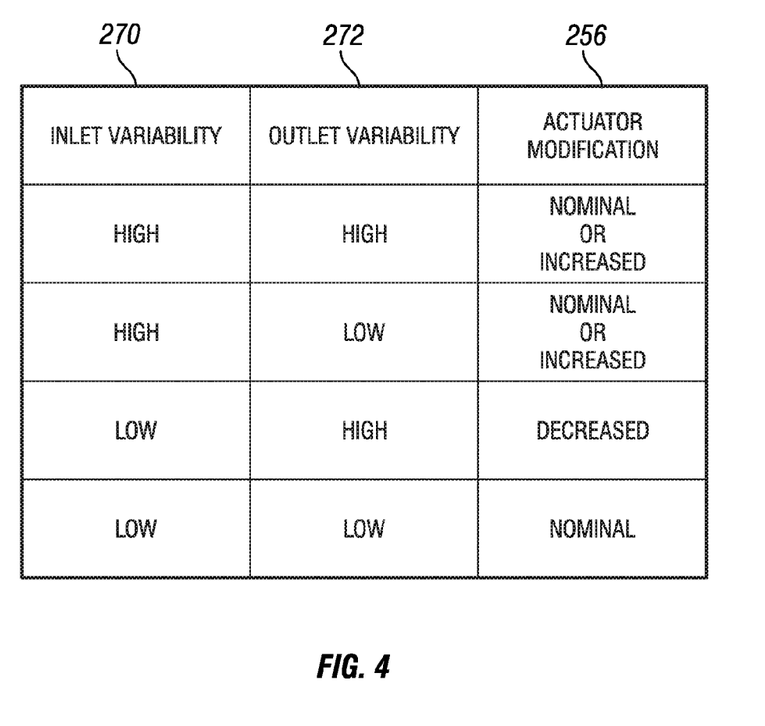
FIG. 4 illustrates exemplary reductant doser adjustments to error variability utilized in controlling SCR aftertreatment systems.

An exemplary operation for the response dampening module 216 is illustrated in FIG. 4. The inlet variability 270 is a variability parameter 266 of the first SCR catalyst 106 inlet, and the outlet variability 272 is a variability parameter 266 of the first SCR catalyst 106 outlet. The response dampening module 216 provides the actuator modification 256 in response to the values of the inlet variability 270 and the outlet variability 272. In one example, the response dampening module 216 increases an amplitude of the actuator response function 250 when the inlet variability 270 is high and the outlet variability 272 is low. In another example, the response dampening module 216 decreases an amplitude of the actuator response function 250 when the inlet variability 270 is low and the outlet variability 272 is high. In another example, the response dampening module 216 increases an amplitude of the actuator response function 250 when the inlet variability 270 is high. In another example, the response dampening module 216 decreases an amplitude of the actuator response function 250 when the outlet variability 272 is high.

Figure 5:
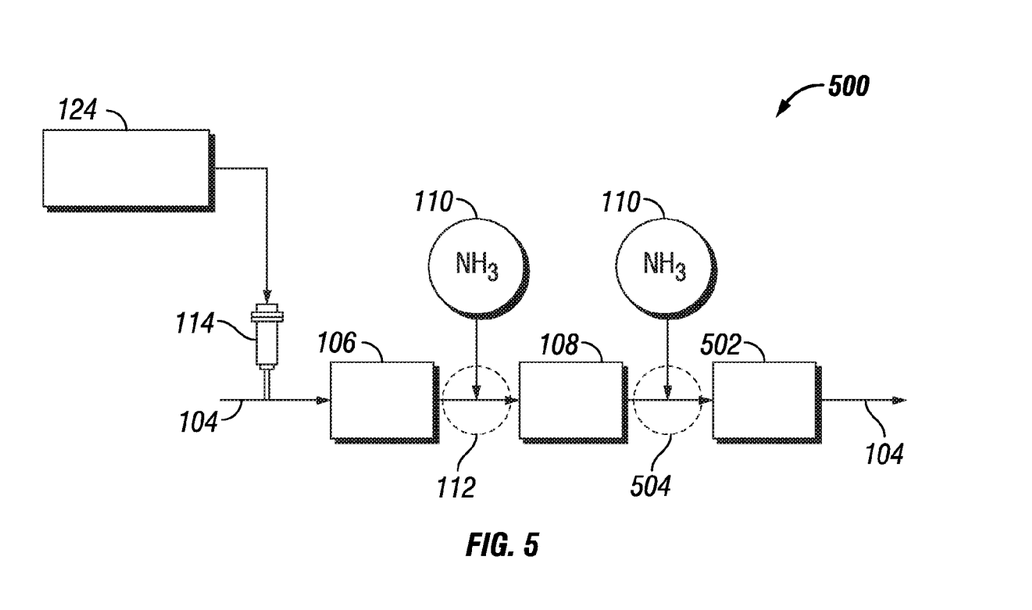
FIG. 5 is a portion of another exemplary system for control of an SCR aftertreatment system.

Referencing FIG. 5, an exemplary system 500 further includes a third SCR catalyst 502 fluidly coupled to the exhaust conduit 104 at a position downstream of the second SCR catalyst 108. The system 500 includes a second ammonia sensor 110 operationally coupled to the exhaust conduit 104 at a position 504 between the second SCR catalyst 108 and the third SCR catalyst 502. The controller 116 in the exemplary system further includes a $NO_x$ trimming module 214 that adjusts the reductant injector command 232 in a feedback control loop to control an amount of $NH_3$ 226 measured at the second ammonia sensor 110 to a small, non-zero. A further exemplary embodiment includes the $NO_x$ trimming module 214 adjusting the reductant injector command 232 as an outer ammonia loop control with respsect to a control operation of the $NH_3$ determination module 204 (acting as the "inner loop"). The outer ammonia loop control, as used herein, indicates that the $NO_x$ trimming module 214 adjusts the reductant injector command 232 more slowly than, and independent of, the $NH_3$ determination module 204. More slowly indicates that a control response will be smaller over short time periods (less than 1 second, 10 seconds, 1 minute, several minutes, or even over several hours in certain embodiments) for a given $NH_3$ offset (the $NH_3$ error term 248 for the $NH_3$ determination module 204, and the difference between the measured $NH_3$ as the second $NH_3$ sensor 110 at 504 for the $NO_x$ trimming module 214).

In certain further embodiments, the $NO_x$ trimming module 214 adjusts the reductant injector command 232 in the feedback control loop with a low-gain controller including an integral component. An exemplary low-gain controller includes a gain term on the integral component of the controller in the $NO_x$ trimming module 214 that is significantly lower than a gain term of an integral component of the controller in the $NH_3$ determination module 204. Significantly lower gain is an amount dependent upon the specific embodiment, but is a value less than ½ (for the same gain units) and may be less than $\frac{1}{10}^{th}$ or $\frac{1}{100}^{th}$ in certain further embodiments. Another exemplary low-gain controller includes a gain term on the integral component of the controller in the $NO_x$ trimming module 214 that provides significantly slower response to a persisting error value than the response of the $NO_x$ determination module.

A small, non-zero value of ammonia at the position 504 is any value between a measurable value according to the available precision of the ammonia sensor 110 up to an amount of ammonia that will not exceed the ammonia slip limits of the system 500, including without limitation, limits of 3 ppm, 5 ppm, 10 ppm, or 20 ppm ammonia. Higher values of ammonia may be within the range of a small, non-zero value, especially where the size of the third SCR catalyst 502 is significant, and/or where a capable AMOX 126 is downstream of the second ammonia sensor. The feedback control loop operates as a PI controller, a PID controller, a proportional or integral-only controller, a fuzzy controller, or any other type of feedback controller understood in the art.

Figure 6:
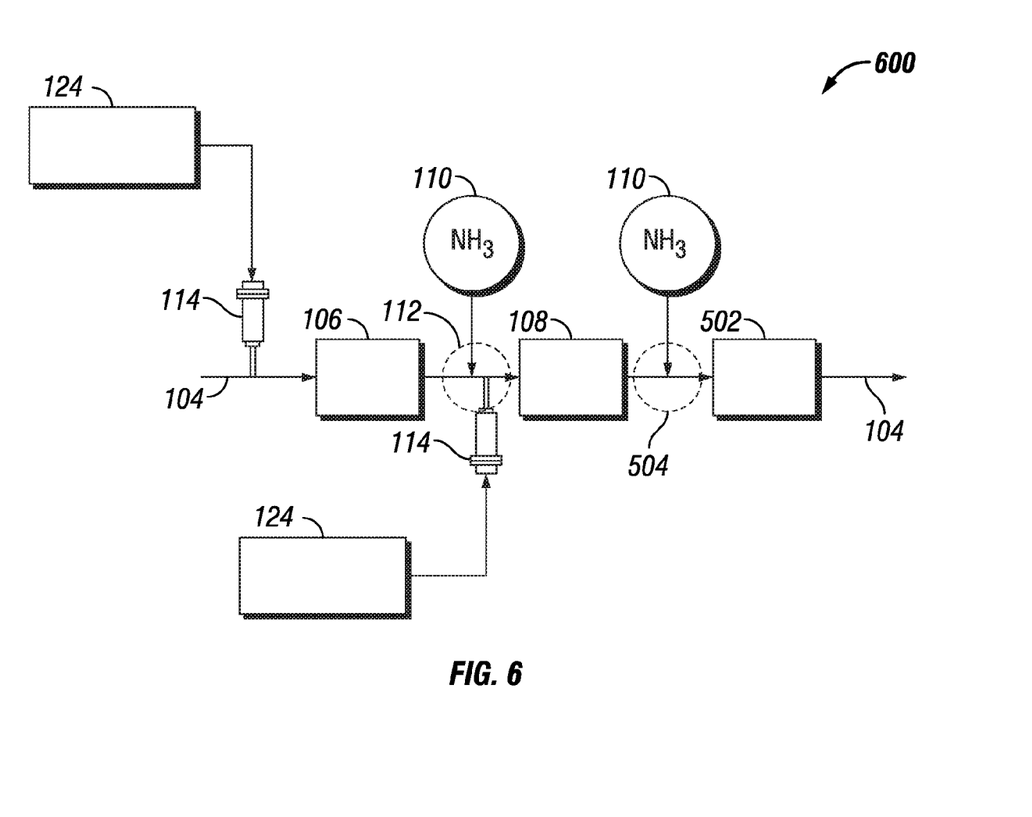
FIG. 6 is a portion of yet another exemplary system for control of an SCR aftertreatment system.

Referencing FIG. 6, an exemplary system 600 further includes a third SCR catalyst 502 fluidly coupled to the exhaust conduit 104 at a position downstream of the second SCR catalyst 108. The system 600 includes a second reductant doser 114 operationally coupled to the exhaust conduit at a position 112 between the first SCR catalyst 106 and the second SCR catalyst 108. The exemplary system 600 includes a second ammonia sensor 110 operationally coupled to the exhaust conduit 104 at a position between the second SCR catalyst 108 and the third SCR catalyst 502. The controller 116 further includes the $NO_x$ trimming module 214 that adjusts a second reductant doser command 234 in a feedback control loop to control the amount of $NH_3$ 226 measured at the second ammonia sensor to a small, non-zero value.

In certain embodiments, the controller 116 further includes an $NH_3$ fill-up module 218 that determines whether an $NH_3$ fill-up override condition 236 is present, and the dosing control module 212 increases the reductant injector command 232 in response to the $NH_3$ fill-up override condition 236. The $NH_3$ fill-up module 218 determines the $NH_3$ fill-up override condition 236 is present in response to a temperature of the first SCR catalyst being below a catalyst temperature threshold 240 and the amount of $NH_3$ 220 being below an $NH_3$ reading threshold 242. The $NH_3$ reading threshold 242 may be a very small amount of ammonia (e.g. several ppm), a zero amount of ammonia, and/or an amount of ammonia that is lower than an expected amount of ammonia (e.g. from a model or according to the amount injected) by a threshold amount.

Exemplary $NH_3$ reading thresholds 242 include zero, about zero, below a diagnostic threshold value, and about 4 ppm $NH_3$. Exemplary catalyst temperature threshold values include a temperature such that significant catalyst storage capability is present, or alternatively about 300° C. In another embodiment, the $NH_3$ fill-up module 218 determines the $NH_3$ fill-up override condition 236 is present in response to an engine cold start event and a determination that ammonia is not yet measured in significant amounts between the first SCR catalyst and the second SCR catalyst.

The dosing control module 212 increases the reductant injector command 232 to a highest available dosing value, an ANR of at least 2.0, an ANR of at least 3.0, an ANR of at least 4.0, or a value of an actuator response function consistent with a highest meaningful response index value. Referencing FIG. 3, the actuator response function 250b, an exemplary dosing control module 212 increases the reductant injector command 232 to the "very high" reductant dosing reference 306, or to a value even higher than the available values according to the actuator response function 250b. The dosing control module 212 resumes normal operations in response to the $NH_3$ fill-up override condition 236 not being present. In certain embodiments, the dosing control module 212 resumes normal operations as soon as a non-zero amount of $NH_3$ and/or a diagnostically significant amount of $NH_3$ is present between the first SCR catalyst and the second SCR catalyst.

An exemplary system 100 further includes a mid-bed temperature sensor 128 positioned in proximity to the ammonia sensor 110. The exemplary controller 116 prevents operations of the ammonia sensor 110 when a mid-bed temperature 228 indicates the ammonia sensor 110 is below a mid-bed temperature threshold 262. The threshold 262 may be selected as understood in the art—including at least a temperature where normal operation of the ammonia sensor is expected to commence and a dew-point temperature 264. The dew-point temperature 264 prevents the ammonia sensor 110 from ingesting liquid water and subsequently being damaged. The determination of a dew point temperature 264 may be performed by determining the humidity and temperature at the sensor. The humidity at the sensor may be determined by the ambient humidity and water contributed by combustion in the engine, or by estimating a conservative (e.g. high relative humidity) humidity estimate for the ambient air. In certain embodiments, the controller 116 prevents operations of the ammonia sensor 110 below a cutoff temperature threshold that represents a generally applicable dew-point temperature without determining a specific dew-point temperature.

The descriptions which follow provide illustrative embodiments of performing procedures for controlling an SCR aftertreatment system. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An exemplary procedure includes an operation to determine an amount of ammonia ($NH_3$) present at a first exhaust gas conduit position that is downstream of a first selective catalytic reduction (SCR) catalyst and upstream of a second SCR catalyst. The procedure further includes an operation to determine an actuator response function in response to at least one operating condition of the first SCR catalyst, where the actuator response function includes a reductant injector response as a function of the amount of $NH_3$, and where the actuator response function includes a response discontinuity. The procedure further includes an operation to determine a reductant injection amount in response to the amount of $NH_3$ and the actuator response function, and an operation to inject an amount of reductant upstream of the first SCR catalyst in response to the reductant injection amount.

In certain embodiments, the actuator response function includes a high response value and a low response value, where the high response value includes an ammonia to $NO_x$ ratio (ANR) greater than a current stoichiometric value, and where the low response value comprises an ANR lower than the current stoichiometric value. The exemplary procedure further includes an operation to determine the reductant injection amount as only one of the high response value and the low response value, and to calculate the high response value and the low response value according to the at least one operating condition of the first SCR catalyst. Exemplary operating conditions of the first SCR catalyst include a space velocity of the first SCR catalyst, a flow rate through the first SCR catalyst, and a bed temperature of the first SCR catalyst.

The exemplary procedure further includes an operation to dynamically track a variability parameter, and to modify an amplitude of the actuator response function in response to the variability parameter. The amplitude of the actuator response function is a difference between a highest response and a lowest response, or alternatively a difference between a high response and a low response on each side of a discontinuity in the actuator response function.

In certain embodiments, the discontinuity includes a step change in the actuator response that results in an incremental change greater than 2% of the reductant injector flow rate. In further embodiments, the discontinuity includes a step change that changes the reductant injector flow rate by more than 10% (e.g. from ANR 0.9 to ANR>1.0), by more than 20% (e.g. from ANR 0.9 to ANR>1.1), by more than 50% (e.g. from ANR 0.7 to ANR>1.05), by more than 100% (e.g. from ANR 0.7 to ANR>1.4), by more than 200% (e.g. ANR 0.5 to ANR>2.0), or more. The incremental change around the discontinuity is determined according to considerations described herein for determining the values of the high response value and low response value, and for determining how much of a response rise or decline occurs in the actuator response function away from the discontinuity (e.g. reference the actuator response function 250c). In certain embodiments, the discontinuity does not result in an incremental change greater than 2% of the reductant injector flow rate (e.g. reference the actuator response function 250d).

In certain embodiments, the procedure includes an operation to track a recent error history variability, where the error of the error history variability is a difference between the amount of $NH_3$ and a target amount of $NH_3$. The exemplary procedure further includes an operation to change an amplitude of the actuator response function inversely with the recent error history variability.

A further exemplary procedure includes an operation to dynamically track an inlet variability and an outlet variability, and to increase an amplitude of the actuator response function when the inlet variability is high and the outlet variability is low. Another exemplary procedure includes an operation to dynamically track an inlet variability and an outlet variability, and an operation to decrease an amplitude of the actuator response function when the inlet variability is low and the outlet variability is high. Yet another exemplary procedure includes an operation to dynamically track an inlet variability, and to increase an amplitude of the actuator response function when the inlet variability is high. Yet another exemplary procedure includes an operation to dynamically track an outlet variability, and to decrease an amplitude of the actuator response function when the outlet variability is high. Another exemplary procedure includes an operation to determine a mid-bed temperature, and to prevent operations of an ammonia sensor when the mid-bed temperature is below a threshold; an exemplary threshold for is a dew-point temperature.

An exemplary procedure includes an operation to determine whether an $NH_3$ fill-up override condition is present, and to increase the injected amount of reductant in response to the $NH_3$ fill-up override condition. The procedure further includes determining whether an $NH_3$ fill-up override condition by determining whether a temperature of the first SCR catalyst is below a catalyst temperature threshold and whether the present amount of $NH_3$ is below an $NH_3$ reading threshold. The $NH_3$ reading threshold can be zero, about zero, a diagnostic threshold value, and about 4 ppm $NH_3$. The catalyst temperature threshold includes a value selected from a temperature such that significant catalyst storage capability is present, and 300° C.

The exemplary procedure further includes an operation to increase the injected amount of reductant by an operation including injecting at a highest available dosing rate, injecting to an ANR of at least 2.0, injecting to an ANR of at least 3.0, injecting to an ANR of at least 4.0, and/or injecting at a value of an actuator response function consistent with a highest meaningful response index value. The exemplary procedure further includes an operation to resume normal operations in response to the amount of $NH_3$ being one of a non-zero amount of $NH_3$ and a diagnostically significant amount of $NH_3$.

As is evident from the figures and text presented above, a variety of embodiments according to the present invention are contemplated.

An exemplary method includes determining an amount of ammonia ($NH_3$) present at a first exhaust gas conduit position that is downstream of a first selective catalytic reduction (SCR) catalyst and upstream of a second SCR catalyst, determining an actuator response function in response to at least one operating condition of the first SCR catalyst, where the actuator response function includes a reductant injector response as a function of the amount of $NH_3$, and where the actuator response function includes a response discontinuity. The method further includes determining a reductant injection amount in response to the amount of $NH_3$ and the actuator response function, and injecting an amount of reductant upstream of the first SCR catalyst in response to the reductant injection amount. In certain embodiments, the actuator response function includes a high response value and a low response value, where the high response value includes an ammonia to $NO_x$ ratio (ANR) greater than a current stoichiometric value, and where the low response value comprises an ANR lower than the current stoichiometric value.

The exemplary method includes determining the reductant injection amount as only one of the high response value and the low response value. The method further includes calculating the high response value and the low response value according to the at least one operating condition of the first SCR catalyst.

An exemplary method includes dynamically tracking a variability parameter, and modifying an amplitude of the actuator response function in response to the variability parameter. The amplitude of the actuator response function is a difference between a highest response and a lowest response, or alternatively a difference between a high response and a low response on each side of a discontinuity in the actuator response function. In certain embodiments, the method includes tracking a recent error history variability, where the error of the error history variability is a difference between the amount of $NH_3$ and a target amount of $NH_3$. The method further includes changing an amplitude of the actuator response function inversely with the recent error history variability.

An exemplary method includes dynamically tracking an inlet variability and an outlet variability, and increasing an amplitude of the actuator response function when the inlet variability is high and the outlet variability is low. Another exemplary method includes dynamically tracking an inlet variability and an outlet variability, and decreasing an amplitude of the actuator response function when the inlet variability is low and the outlet variability is high. Yet another exemplary method includes dynamically tracking an inlet variability, and increasing an amplitude of the actuator response function when the inlet variability is high. Yet another exemplary method includes dynamically tracking an outlet variability, and decreasing an amplitude of the actuator response function when the outlet variability is high. Another exemplary method includes determining a mid-bed temperature, and preventing operations of an ammonia sensor when the mid-bed temperature is below a threshold. The method further includes the threshold being a dew-point temperature.

An exemplary method includes determining whether an $NH_3$ fill-up override condition is present, and increasing the injected amount of reductant in response to the $NH_3$ fill-up override condition. Determining whether an $NH_3$ fill-up override condition is present includes determining whether a temperature of the first SCR catalyst is below a catalyst temperature threshold and the present amount of $NH_3$ is below an $NH_3$ reading threshold. The $NH_3$ reading threshold can be zero, about zero, a diagnostic threshold value, and about 4 ppm $NH_3$. The catalyst temperature threshold includes a value selected from a temperature such that significant catalyst storage capability is present, and 300° C. The exemplary method includes increasing the injected amount of reductant by an operation selected from the operations including injecting at a highest available dosing rate, injecting to an ANR of at least 2.0, injecting to an ANR of at least 3.0, injecting to an ANR of at least 4.0, and a value of an actuator response function consistent with a highest meaningful response index value. The exemplary method further includes resuming normal operations in response to the amount of $NH_3$ being one of a non-zero amount of $NH_3$ and a diagnostically significant amount of $NH_3$.

Another exemplary embodiment is an apparatus including an ammonia ($NH_3$) determination module that determines an amount of $NH_3$ present at a first exhaust gas conduit position. The first exhaust gas conduit position is downstream of a first SCR catalyst and upstream of a second SCR catalyst. The apparatus further includes a response bounding module that computes an actuator response function in response to at least one operating condition of the first SCR catalyst, where the actuator response function includes a reductant injector response as a function of the amount of $NH_3$, and where the actuator response function includes a response discontinuity. The apparatus further includes a dosing amount module that determines a reductant injection amount in response to the amount of $NH_3$ and the actuator response function, and a dosing control module that provides a reductant injector command in response to the reductant injection amount.

The exemplary apparatus further includes an ammonia target module that determines an ammonia reference target that is a target amount of ammonia at the first exhaust gas conduit position, and an ammonia error module that determines an ammonia error term in response to the ammonia reference target and the amount of ammonia. The dosing amount module further determines the reductant injection amount in response to the ammonia error term. The ammonia reference target is value selected from: greater than zero, greater than 5 ppm $NH_3$, less than a stoichiometric ANR, and greater than the stoichiometric ANR. The actuator response function includes a high response value and a low response value, where the high response value includes an ANR ratio greater than a current stoichiometric value, and where the low response value includes an ANR lower than the current stoichiometric value. In certain embodiments, the low response value is less than a stoichiometric value minus a confidence interval, and/or the high response value is greater than a stoichiometric value plus a confidence interval.

Selected values for the high response value include a value between 1.1 and 2.5 times stoichiometric. Selected values for the low response value include values between 0.7 and less than 1 times stoichiometric, and 0.9 and less than 1 times stoichiometric. In certain embodiments, the dosing amount module further determines the reductant injection amount as one off the low response value and the high response value.

An exemplary apparatus includes the actuator response function further comprising a very low response value and/or a very high response value, where the very low response value includes values between 0 and 0.3 times stoichiometric, and where the very high response value includes a value between 2.5 and 5 times stoichiometric. The low response value, high response value, very low response value, and/or the very high response values are dynamically calculated according to the at least one operating condition of the first SCR catalyst.

The exemplary apparatus further includes a response dampening module that dynamically tracks a variability parameter, and modifies the actuator response function in response to the variability parameter. Exemplary variability parameters and modifications are described. An example includes the variability parameter being a recent error history variability and the response dampening module changes an amplitude of the actuator response function inversely with the recent error history variability. Another example includes the variability parameter being an inlet variability and an outlet variability, and the response dampening module decreases an amplitude of the actuator response function when the inlet variability is high and the outlet variability is low. The inlet variability and the outlet variability may be the variability of the flow rate of $NO_x$ or $NH_3$ with respect to time, and/or a variability of a total flow rate at the inlet and/or outlet.

Yet another example includes the variability parameter being an inlet variability and an outlet variability, and the response dampening module decreasing the amplitude of the actuator response function when the inlet variability is low and the outlet variability is high. Yet another example includes the variability parameter being an inlet variability and the response dampening module increasing an amplitude of the actuator response function when the inlet variability is high. Still another example includes the variability parameter being an outlet variability, and the response dampening module decreases an amplitude of the actuator response function when the outlet variability is high.

Another exemplary embodiment is a system including an internal combustion engine, an exhaust conduit fluidly coupled to the internal combustion engine, a first SCR catalyst fluidly coupled to the exhaust conduit, and a second SCR catalyst fluidly coupled to the exhaust conduit at a position downstream of the first SCR catalyst. The system further includes an ammonia sensor operationally coupled to the exhaust conduit at a first exhaust gas position downstream of the first SCR catalyst and upstream of the second SCR catalyst, a reductant doser operationally coupled to the exhaust conduit at a position upstream of the first SCR catalyst, and a controller having a number of modules structured to functionally execute operations for controlling an SCR aftertreatment system.

The controller includes an ammonia ($NH_3$) determination module that determines an amount of $NH_3$ present at the first exhaust gas position, and a response bounding module that computes an actuator response function in response to at least one operating condition of the first SCR catalyst. The actuator response function includes a reductant injector response as a function of the amount of $NH_3$, the actuator response function having a response discontinuity. The system further includes a dosing amount module that determines a reductant injection amount in response to the amount of $NH_3$ and the actuator response function, and a dosing control module that provides a reductant injector command in response to the reductant injection amount. In certain embodiments, the at least one operating condition of the first SCR catalyst excludes any temperature input between the engine and the first SCR catalyst.

An exemplary actuator response function includes a high response value and a low response value, where the high response value includes an ANR ratio greater than a current stoichiometric value, and where the low response value includes an ANR lower than the current stoichiometric value. In certain embodiments, the low response value and/or high response value are dynamically calculated according to the operating condition(s) of the first SCR catalyst. Certain embodiments of the system do not include a $NO_x$ sensor present upstream of the first SCR catalyst, and/or do not include a $NO_x$ sensor downstream of the second SCR catalyst. In certain embodiments, the system does not include an ammonia oxidation (AMOX) catalyst downstream of the second SCR catalyst, and further embodiments do not include AMOX materials commingled with the second SCR catalyst.

In certain embodiments, the operating condition of the first SCR catalyst includes a current space-velocity of the first SCR catalyst, a flow rate through the first SCR catalyst, a bed temperature of the first SCR catalyst, a $NO_x$ concentration at the first SCR catalyst inlet, an engine torque value, an engine fueling rate, a current $NH_3$ storage amount, a current $NH_3$ storage capacity, and/or a current $NH_3$ storage capacity available. Another exemplary operating condition includes an inlet temperature of the first SCR catalyst, although in certain embodiments, the operating condition excludes any temperature input between the engine and the first SCR catalyst.

An exemplary system further includes a third SCR catalyst fluidly coupled to the exhaust conduit at a position downstream of the second SCR catalyst, and a second ammonia sensor operationally coupled to the exhaust conduit at a position between the second SCR catalyst and the third SCR catalyst. The controller in the exemplary system further includes a $NO_x$ trimming module that adjusts the reductant injector command in a feedback control loop to control a second ammonia amount measured at the second ammonia sensor to a small, non-zero value. A further exemplary embodiment includes the $NO_x$ trimming module adjusting the reductant injector command in the feedback control loop as an outer ammonia loop control with respect to a control operation of the $NH_3$ determination module. The outer ammonia loop control, as used herein, indicates that the $NO_x$ trimming module adjusts the reductant injector command more slowly than, and independent of, the $NH_3$ determination module. More slowly indicates that a control response will be smaller over short time periods (less than 1 second, 10 seconds, 1 minute, several minutes, or even over several hours in certain embodiments) for a given $NH_3$ offset (the $NH_3$ error term for the $NH_3$ determination module, and the difference between the $NH_3$ measured at the second ammonia sensor and a small, non-zero amount for the $NO_x$ trimming module).

In certain further embodiments, the $NO_x$ trimming module adjusts the reductant injector command in the feedback control loop with a low-gain controller including an integral component. The low-gain controller includes a gain term on the integral component of the controller in the $NO_x$ trimming module that is significantly lower than a gain term of an integral component of the controller in the NH3 determination module. Significantly lower is an amount dependent upon the specific embodiment, but is a value less than ½ (for the same gain units) and may be less than $\frac{1}{10}^{th}$ or $\frac{1}{100}^{th}$ in certain further embodiments.

An exemplary system further includes a third SCR catalyst fluidly coupled to the exhaust conduit at a position downstream of the second SCR catalyst and a second reductant doser operationally coupled to the exhaust conduit at a position between the first SCR catalyst and the second SCR catalyst. The exemplary system includes a second ammonia sensor operationally coupled to the exhaust conduit at a position between the second SCR catalyst and the third SCR catalyst. The controller further includes a $NO_x$ trimming module that adjusts a second reductant doser command in a feedback control loop to control a second ammonia amount measured at the second ammonia sensor to a small, non-zero value.

Another exemplary system includes the actuator response function having a response discontinuity that includes at least one range of reductant dosing reference values that are not available reductant injector responses. the range of not available reductant injector responses are between a minimum reductant dosing reference and a maximum reductant dosing reference.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining an amount of ammonia (NH3) present at a first exhaust gas conduit position that is downstream of a first selective catalytic reduction (SCR) catalyst and upstream of a second SCR catalyst;
   determining an actuator response function in response to at least one operating condition of the first SCR catalyst, wherein the actuator response function comprises a reductant injector response as a function of the amount of NH3, the actuator response function having a response discontinuity;

determining a reductant injection amount in response to the amount of NH3 and the actuator response function;

injecting an amount of reductant upstream of the first SCR catalyst in response to the reductant injection amount; and further comprising determining whether an NH3 fill-up override condition is present, and increasing the injected amount of reductant in response to the NH3 fill-up override condition.

2. The method of claim 1, wherein the actuator response function comprises a high response value and a low response value, wherein the high response value comprises an ammonia to NOx ratio greater than a current stoichiometric value, and wherein the low response value comprises an ammonia to NOx ratio lower than the current stoichiometric value.

3. The method of claim 2, further comprising determining the reductant injection amount as only one of the high response value and the low response value.

4. The method of claim 2, further comprising calculating the high response value and the low response value according to the at least one operating condition of the first SCR catalyst.

5. The method of claim 1, further comprising dynamically tracking a variability parameter, and modifying an amplitude of the actuator response function in response to the variability parameter.

6. The method of claim 1, further comprising determining a mid-bed temperature, and preventing operations of an ammonia sensor when the mid-bed temperature is below a threshold.

7. The method of claim 6, wherein the threshold comprises a dew-point temperature.

8. The method of claim 1, wherein the determining whether an NH3 fill-up override condition is present comprises determining whether a temperature of the first SCR catalyst is below a catalyst temperature threshold and the present amount of NH3 is below an NH3 reading threshold.

9. The method of claim 8, wherein the NH3 reading threshold comprises a value selected from the values consisting of: zero, about zero, a diagnostic threshold value, and about 4 ppm NH3.

10. The method of claim 8, wherein the catalyst temperature threshold comprises a value selected from the values consisting of: a temperature such that significant catalyst storage capability is present, and 300° C.

11. The method of claim 8, increasing the injected amount of reductant comprises a operation selected from the operations consisting of: injecting at a highest available dosing rate, injecting to an ammonia to NOx ratio (ANR) of at least 2.0, injecting to an ANR of at least 3.0, injecting to an ANR of at least 4.0, and a value of an actuator response function consistent with a highest meaningful response index value.

12. The method of claim 1, further comprising resuming normal operations in response to the amount of NH3 being one of a non-zero amount of NH3 and a diagnostically significant amount of NH3.

13. A method, comprising:

determining an amount of ammonia (NH3) present at a first exhaust gas conduit position that is downstream of a first selective catalytic reduction (SCR) catalyst and upstream of a second SCR catalyst;

determining an actuator response function in response to at least one operating condition of the first SCR catalyst, wherein the actuator response function comprises a reductant injector response as a function of the amount of NH3, the actuator response function having a response discontinuity;

tracking a recent error history variability, the error comprising a difference between the amount of NH3 and a target amount of NH3, the method further comprising changing an amplitude of the actuator response function inversely with the recent error history variability;

determining a reductant injection amount in response to the amount of NH3 and the actuator response function; and injecting an amount of reductant upstream of the first SCR catalyst in response to the reductant injection amount.

14. A method, comprising:

determining an amount of ammonia (NH3) present at a first exhaust gas conduit position that is downstream of a first selective catalytic reduction (SCR) catalyst and upstream of a second SCR catalyst;

determining an actuator response function in response to at least one operating condition of the first SCR catalyst, wherein the actuator response function comprises a reductant injector response as a function of the amount of NH3, the actuator response function having a response discontinuity;

dynamically tracking an inlet variability and an outlet variability, and increasing an amplitude of the actuator response function when the inlet variability is high and the outlet variability is low;

determining a reductant injection amount in response to the amount of NH3 and the actuator response function; and injecting an amount of reductant upstream of the first SCR catalyst in response to the reductant injection amount.

15. A method, comprising:

determining an amount of ammonia (NH3) present at a first exhaust gas conduit position that is downstream of a first selective catalytic reduction (SCR) catalyst and upstream of a second SCR catalyst;

determining an actuator response function in response to at least one operating condition of the first SCR catalyst, wherein the actuator response function comprises a reductant injector response as a function of the amount of NH3, the actuator response function having a response discontinuity;

dynamically tracking an inlet variability and an outlet variability, and decreasing an amplitude of the actuator response function when the inlet variability is low and the outlet variability is high;

determining a reductant injection amount in response to the amount of NH3 and the actuator response function; and injecting an amount of reductant upstream of the first SCR catalyst in response to the reductant injection amount.

16. A method, comprising:

determining an amount of ammonia (NH3) present at a first exhaust gas conduit position that is downstream of a first selective catalytic reduction (SCR) catalyst and upstream of a second SCR catalyst;

determining an actuator response function in response to at least one operating condition of the first SCR catalyst, wherein the actuator response function comprises a reductant injector response as a function of the amount of NH3, the actuator response function having a response discontinuity;

dynamically tracking an inlet variability, and increasing an amplitude of the actuator response function when the inlet variability is high;

determining a reductant injection amount in response to the amount of NH3 and the actuator response function; and injecting an amount of reductant upstream of the first SCR catalyst in response to the reductant injection amount.

17. A method, comprising:

determining an amount of ammonia (NH3) present at a first exhaust gas conduit position that is downstream of a first selective catalytic reduction (SCR) catalyst and upstream of a second SCR catalyst;

determining an actuator response function in response to at least one operating condition of the first SCR catalyst, wherein the actuator response function comprises a reductant injector response as a function of the amount of NH3, the actuator response function having a response discontinuity;

dynamically tracking an outlet variability, and decreasing an amplitude of the actuator response function when the outlet variability is high;

determining a reductant injection amount in response to the amount of NH3 and the actuator response function; and injecting an amount of reductant upstream of the first SCR catalyst in response to the reductant injection amount.

18. An apparatus, comprising:

a reductant doser operationally coupled to an exhaust conduit at a position upstream of a first SCR catalyst; and a controller operationally coupled to control the reductant doser, the controller comprising:

an ammonia (NH3) determination module structured to determine an amount of NH3 present at a first exhaust gas conduit position, the first exhaust gas conduit position downstream of the first SCR catalyst and upstream of a second SCR catalyst;

a response bounding module structured to compute an actuator response function in response to at least one operating condition of the first SCR catalyst, wherein the actuator response function comprises a reductant injector response as a function of the amount of NH3, the actuator response function having a response discontinuity;

a dosing amount module structured to determine a reductant injection amount in response to the amount of NH3 and the actuator response function;

a dosing control module structured to provide a reductant injector command in response to the reductant injection amount;

a response dampening module structured to dynamically track a variability parameter, and to modify the actuator response function in response to the variability parameter, wherein the variability parameter and modification comprise a combination selected from the combinations consisting of:

the variability parameter comprises a recent error history variability and the response dampening module is structured to change an amplitude of the actuator response function inversely with the recent error history variability;

the variability parameter comprises an inlet variability and an outlet variability, and the response dampening module is structured to increase an amplitude of the actuator response function when the inlet variability is high and the outlet variability is low;

the variability parameter comprises an inlet variability and an outlet variability, and the response dampening module is structured to decrease an amplitude of the actuator response function when the inlet variability is low and the outlet variability is high;

the variability parameter comprises an inlet variability and the response dampening module is structured to increase an amplitude of the actuator response function when the inlet variability is high; and the variability parameter comprises an outlet variability, and the response dampening module is structured to decrease an amplitude of the actuator response function when the outlet variability is high;

wherein the reductant injector command operates the reductant doser to inject an amount of reductant upstream of the first SCR catalyst equal to the reductant injection amount.

19. The apparatus of claim 18, further comprising:

an ammonia target module structured to determine an ammonia reference target comprising a target amount of ammonia at the first exhaust gas conduit position;

an ammonia error module structured to determine an ammonia error term in response to the ammonia reference target and the amount of ammonia;-and wherein the dosing amount module is further structured to determine the reductant injection amount in response to the ammonia error term.

20. The apparatus of claim 19, wherein the ammonia reference target is one of: greater than zero, greater than 5 ppm NH3, less than a stoichiometric ANR, and greater than the stoichiometric ANR.

21. The apparatus of claim 19, wherein the actuator response function comprises a high response value and a low response value, wherein the high response value comprises an ANR ratio greater than a current stoichiometric value, and wherein the low response value comprises an ANR lower than the current stoichiometric value.

22. The apparatus of claim 21, wherein the low response value is less than the stoichiometric value minus a confidence interval.

23. The apparatus of claim 21, wherein the high response value is greater than the stoichiometric value plus a confidence interval.

24. The apparatus of claim 21, wherein the high response value comprises a value between 1.1 and 2.5 times stoichiometric.

25. The apparatus of claim 21, wherein the low response value comprises a value between 0.7 and less than 1 times stoichiometric.

26. The apparatus of claim 21, wherein the low response value comprises a value between 0.9 and less than 1 times stoichiometric.

27. The apparatus of claim 21, wherein the dosing amount module is further structured to determine the reductant injection amount as only one of the low response value and the high response value.

28. The apparatus of claim 21, wherein the actuator response function further comprises at least one of a very low response value and a very high response value, the very low response value comprising a value between 0 and 0.3 times stoichiometric, and the very high response value comprising a value between 2.5 and 5 times stoichiometric.

29. The apparatus of claim 21, wherein each of the low response value and the high response value are dynamically calculated according to the at least one operating condition of the first SCR catalyst.

30. A system comprising:

an internal combustion engine; an exhaust conduit fluidly coupled to the internal combustion engine;

a first SCR catalyst fluidly coupled to the exhaust conduit;

a second SCR catalyst fluidly coupled to the exhaust conduit at a position downstream of the first SCR catalyst;

a third SCR catalyst fluidly coupled to the exhaust conduit at a position downstream of the second SCR catalyst;

a first ammonia sensor operationally coupled to the exhaust conduit at a first exhaust gas position downstream of the first SCR catalyst and upstream of the second SCR catalyst;
a second ammonia sensor operationally coupled to the exhaust conduit at a position between the second SCR catalyst and the third SCR catalyst;
a reductant doser operationally coupled to the exhaust conduit at a position upstream of the first SCR catalyst; and
a controller operationally coupled to control the reductant doser, the controller comprising:
an ammonia (NH3) determination module structured to determine an amount of NH3 present at the first exhaust gas position;
a response bounding module structured to compute an actuator response function in response to at least one operating condition of the first SCR catalyst, wherein the actuator response function comprises a reductant injector response as a function of the amount of NH3, the actuator response function having a response discontinuity;
a dosing amount module structured to determine a reductant injection amount in response to the amount of NH3 and the actuator response function;
a dosing control module structured to provide a reductant injector command in response to the reductant injection amount; and
a NOx trimming module structured to adjust the reductant injector command in a feedback control loop to control a second ammonia amount measured at the second ammonia sensor to a small, non-zero value;
wherein the reductant injector command operates the reductant doser to inject an amount of reductant upstream of the first SCR catalyst equal to the reductant injection amount.

31. The system of claim 30, wherein the at least one operating condition of the first SCR catalyst excludes any temperature input between the engine and the first SCR catalyst.

32. The system of claim 31, wherein the actuator response function comprises a high response value and a low response value, wherein the high response value comprises an ANR ratio greater than a current stoichiometric value, and wherein the low response value comprises an ANR lower than the current stoichiometric value.

33. The system of claim 32, wherein each of the low response value and high response value are dynamically calculated according to the at least one operating condition of the first SCR catalyst.

34. The system of claim 30, wherein there is no NOx sensor present upstream of the first SCR catalyst.

35. The system claim 34, wherein there is no NOx sensor present downstream of the second SCR catalyst.

36. The system of claim 30, wherein there is no ammonia oxidation catalyst present downstream of the second SCR catalyst or commingled with the second SCR catalyst.

37. The system of claim 30, wherein the operating condition of the first SCR catalyst comprises at least one condition selected from the conditions consisting of: a current space-velocity of the first SCR catalyst, a flow rate through the first SCR catalyst, a bed temperature of the first SCR catalyst, a NOx concentration at the first SCR catalyst inlet, an engine torque value, an engine fueling rate, a current NH3 storage amount, a current NH3 storage capacity, and a current NH3 storage capacity available.

38. The system of claim 30, wherein the operating condition of the first SCR catalyst includes an inlet temperature of the first SCR catalyst.

39. The system of claim 30, wherein the at least one operating condition of the first SCR catalyst excludes any temperature input between the engine and the first SCR catalyst.

40. The system of claim 30, wherein the NOx trimming module is further structured to adjust the reductant injector command in the feedback control loop as an outer ammonia loop control with respect to a control operation of the NH3 determination module.

41. The system of claim 30, wherein the NOx trimming module is further structured to adjust the reductant injector command in the feedback control loop with a low-gain controller including an integral component.

42. The system of claim 30, further comprising a second reductant doser operationally coupled to the exhaust conduit at a position between the first SCR catalyst and the second SCR catalyst.

43. The system of claim 30, wherein the response discontinuity comprises at least one range of reductant dosing reference values that are not available reductant injector responses, wherein the at least one range of reductant dosing reference values are between a minimum reductant dosing reference and a maximum reductant dosing reference.

* * * * *